July 13, 1965    R. BROWN ETAL    3,194,186
DRIVE-IN FOOD TRAY
Filed Jan. 22, 1964
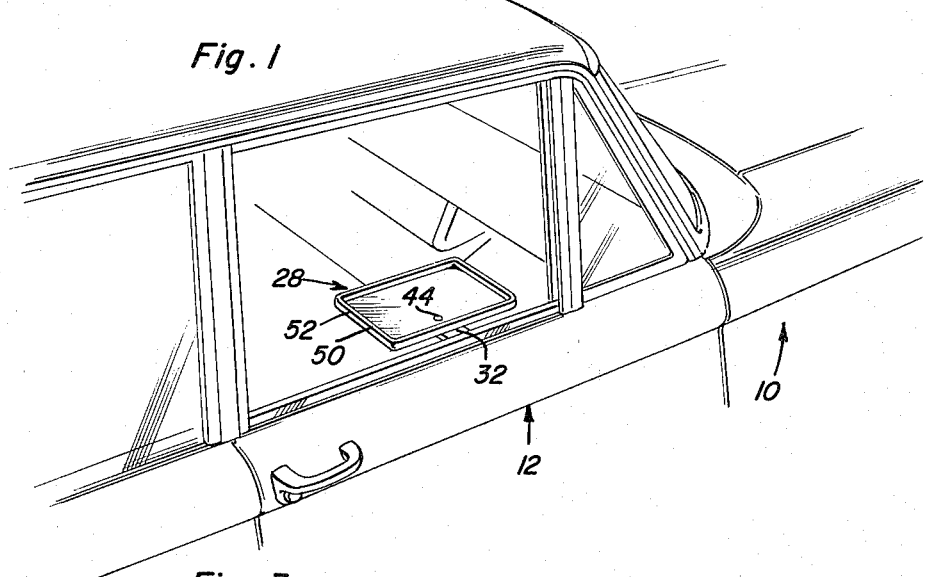
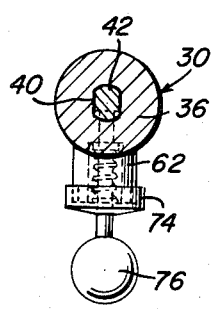
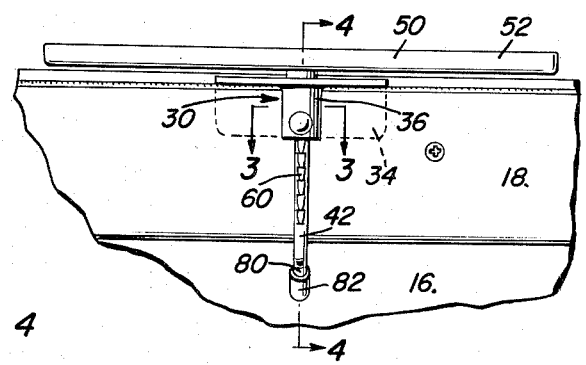
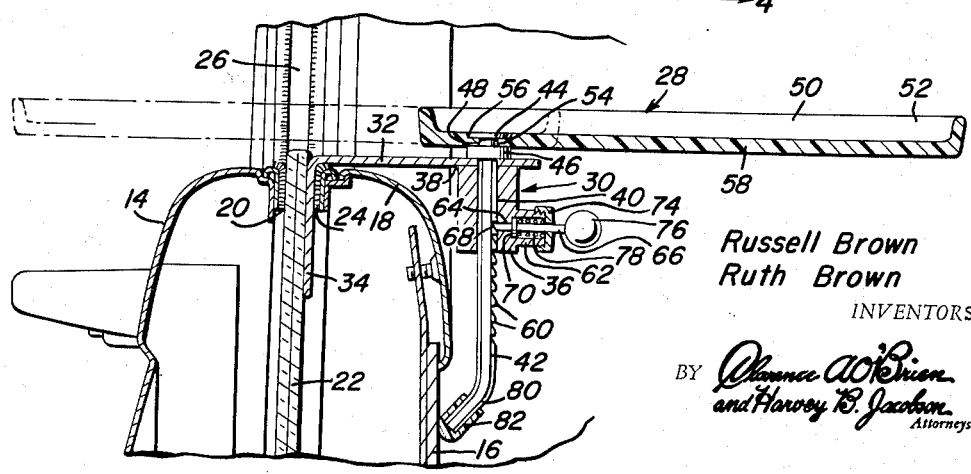
Russell Brown
Ruth Brown
INVENTORS.
BY *Clarence A. O'Brien*
and *Harvey B. Jacobson*
Attorneys United States Patent Office 3,194,186
Patented July 13, 1965

3,194,186
DRIVE-IN FOOD TRAY
Russell Brown and Ruth Brown, both of Rte. 4,
Eureka Springs, Ark.
Filed Jan. 22, 1964, Ser. No. 339,464
6 Claims. (Cl. 108—46)

This invention relates to a novel and useful drive-in food tray and more specifically to a tray construction designed primarily for use as an attachment to the door of a vehicle for the purpose of supporting trays of food thereon. Many drive-in restaurants are presently provided with expensive and elaborate carside stands mounting intercom systems and swingable trays for supporting portable trays of food immediately adjacent a vehicle in a drive-in restaurant. While these elaborate carside stands perform very satisfactorily and are in some instances preferred over the portable types of drive-in food trays which may be removably positioned on a vehicle door, their cost is prohibitive in many instances and it is therefore the main object of this invention to provide an improved portable type drive-in food tray adapted to be supported from the door of a motor vehicle and to support foodstuffs thereon.

A further object of this invention, in accordance with the immediately preceding object, is to provide a drive-in food tray constructed in a manner whereby it may be readily mounted on either the exterior or interior side of a vehicle door and including a tray portion which is pivoted for movement about an upstanding axis thereby enabling the food tray to be mounted on the exterior of a vehicle door and the tray member thereof, at the discretion of the customer, to be swung to a position projecting into the passenger compartment of the vehicle.

Yet another object of this invention is to provide a drive-in food tray in accordance with the preceding objects which, when mounted on the interior of a vehicle door, in view of impending inclement weather, is provided with a tray member that may be readily pivoted to a position with a major portion thereof disposed outwardly of the vehicle door to which it is secured.

Another object of this invention is to provide a drive-in food tray constructed in a manner whereby it is adapted to be secured to various types of vehicle doors.

A final object of this invention to be specifically enumerated herein is to provide a drive-in food tray which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a motor vehicle shown with the drive-in food tray of the instant invention mounted upon the inside of the right front door of the vehicle;

FIGURE 2 is a fragmentary elevational view of the right front door of the vehicle as seen from the inside thereof and with the drive-in food tray mounted thereon;

FIGURE 3 is an enlarged fragmentary horizontal sectional view taken substantially upon the plane indicated by the section line 3—3 of FIGURE 2; and FIGURE 4 is an enlarged fragmentary transverse vertical sectional view taken substantially upon the plane indicated by the section line 4—4 of FIGURE 2.

Referring now more specifically to the drawings the numeral 10 generally designates a conventional form of motor vehicle including a front door generally referred to by the reference numeral 12. The door 12 includes an outer door panel 14 and an inner door panel 16 which is capped by means of a garnish molding 18 extending to the window slot 20 formed in the door 12 in which the window pane 22 is retracted. The window slot 20 includes weatherstripping 24 disposed on opposite sides of the window pane 22 and it is to be understood that the window pane 22 may be raised to close the window opening 26.

The drive-in food tray of the instant invention is generally referred to by the reference numeral 28 and includes a support frame generally referred to by the reference numeral 30 including a generally horizontally disposed and elongated support flange 32 having a downturned end portion 34 on one end thereof which is received in the window slot 20 between the window pane 22 and the inner weatherstrip 24. The end of the support flange 32 remote from the downturned portion 34 has the upper end of a depending sleeve 36 secured thereto in any convenient manner such as by welding 38. The sleeve 36 defines an upstanding bore 40 and it will be noted that the bore 40 also extends upwardly through the portion of the support flange 32 from which the sleeve 36 is supported.

An upstanding shank portion 42 is provided and includes a diametrically enlarged upper flange 44 and a lower diametrically enlarged flange 46, a circumferential groove 48 being defined between the flanges 44 and 46. A tray member 50 is provided and includes an upstanding peripheral wall 52. The tray member 50 is provided with a bore 54 that rotatably receives the shank portion 42 at the groove 48 and the upper end of the bore 54 includes a counterbore 56 in which the upper flange 44 is recessed. The lower flange 46 is disposed between the lower surface 58 of the tray member 50 and the upper surface of the support flange 32 for maintaining the tray member 50 in vertically spaced relation relative to the support flange 32.

The bore 40 is non-circular in cross-section and the shank portion 42 has a corresponding cross-sectional shape whereby the shank portion 42 is prevented from rotating within the bore 40 about its longitudinal axis.

The shank portion 42 includes a plurality of longitudinally spaced and downwardly opening ratchet teeth 60 and the sleeve 36 is provided with a laterally outwardly directed hollow neck portion 62 which terminates at its inner end in a diametrically reduced bore 64 opening inwardly of the bore 40. An elongated detent member 66 including a beveled inner end portion 68 and a diametrically enlarged shoulder 70 is reciprocable in the hollow neck portion 62 with the inner end portion thereof received within the diametrically reduced bore 64. An apertured retaining cap 74 is secured to the outer end of the neck portion 62 and slidably receives the outer end of the detent member 66, the outwardly exposed portion of which is provided with an operating knob 76. A compression spring 78 is disposed between the confronting surfaces of the cap 74 and the diametrically enlarged shoulder 70 and thereby yieldingly urged the bevel inner end portion 68 of the detent member 66 inwardly of the bore 64 and into engagement with a selected one of the ratchet teeth 60.

The lower end of the shank portion 42 includes a laterally directed terminal end portion 80 having a resilient foot 82 on its free end thereof. The laterally directed terminal end portion 80 projects in the direction to which the end of the support flange 32 having the downturned portion 34 thereon projects. Accordingly, it may be seen that the resilient foot or boot 82 may be engaged with the outer panel of the door 12 for coaction with the downturned end portion 34 to support the frame 30 from the inside of the vehicle door 12.

In operation, the drive-in food tray 28 may be mounted either on the exterior or interior of the door 12 and the tray member 50 may be pivoted free from the position illustrated in solid lines in FIGURE 4 of the drawings to the position illustrated in phantom lines in FIGURE 4 of the drawings.

From FIGURE 4 of the drawings it may be seen that the tray 28 may be mounted on the interior of the door 12 with the end portion 34 received between the pane 22 and the weatherstripping 24. The end portion 34 is of a length to prevent it from being lifted out of the slot 20 should there be a tendency for the pane 22 to raise the end portion 34 when the pane 22 is raised. The vertically adjustable shank portion 42 may be raised and lowered relative to the sleeve 36 as desired to properly position the foot 32 on the interior door panel 16. Further, the pane 22 may be raised to a position at least substantially closing the window opening 26 when the tray 28 is mounted on the door 12 as shown in FIGURE 4.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A drive-in food tray comprising a support frame including a generally horizontally disposed elongated support flange including a downturned end portion on one end adapted to engage one upstanding side surface of a vehicle body adjacent the upper end thereof with said horizontally disposed flange extending across and resting upon the upper end of said body portion, a depending upright sleeve carried by the other end portion of said support flange defining an upstanding bore extending therethrough, a generally horizontally disposed tray member, an upstanding shank portion rotatably journaled from said tray member at its upper end and having its lower end portion slidably received through said bore, and coacting detent means carried by said shank portion and said sleeve for releasably retaining said shank portion in adjusted longitudinally shifted positions relative to said sleeve, said bore and shank portions being non-circular in cross-section whereby said shank portion is maintained against rotation in said bore, said shank portion including bumper means on the lower end thereof directed laterally outwardly of the side thereof to which one end of said support flange projects and adapted for abutting engagement with the opposite upstanding side surface of said body portion.

2. The combination of claim 1 wherein said shank portion includes radially enlarged spacing means disposed between said tray member and the upper surface of said flange maintaining said tray member in vertically spaced relation relative to said support flange.

3. The combination of claim 1 wherein said bore and shank portion are non-circular in cross-section whereby said shank portion is maintained against rotation in said bore.

4. The combination of claim 1 wherein said bore also extends through said support flange.

5. The combination of claim 1 wherein said coacting detent means includes a plurality of ratchet teeth formed on said shank portion opening toward the lower end thereof and spaced longitudinally of said shank portion, and detent means carried by said sleeve and spring-urged inwardly of said bore and engaged with a selected one of said teeth.

6. The combination of claim 1 wherein said downturned end portion of said support flange is of a thickness adapted to be received in the window slot of the lower portion of a vehicle door alongside the window pane disposed therein.

References Cited by the Examiner
UNITED STATES PATENTS

| 1,253,083 | 1/18 | Newbury | 108—95 |
| 1,889,783 | 12/32 | Harman | 108—95 |
| 2,020,074 | 11/35 | McGinley | 108—46 |
| 2,593,222 | 4/52 | Tracy | 108—46 |
| 2,676,816 | 4/54 | Kern | 108—44 X |
| 3,037,639 | 6/62 | Kost | 108—47 X |

FRANK B. SHERRY, *Primary Examiner.*